US012179187B2

(12) United States Patent
Meille et al.

(10) Patent No.: US 12,179,187 B2
(45) Date of Patent: Dec. 31, 2024

(54) NANOPARTICLES OF CO COMPLEXES OF ZERO-VALENT METALS THAT CAN BE USED AS HYDROSILYLATION AND DEHYDROGENATIVE SILYLATION CATALYSTS

(71) Applicants: ELKEM SILICONES FRANCE SAS, Lyons (FR); UNIVERSITE CLAUDE BERNARD LYON I, Villeurbanne (FR); CPE LYON FORMATION CONTINUE ET RECHERCHE—CPE LYON CFR, Villeurbanne (FR); CENTRE NATIONAL DE LA RECHERCHE SCIENTIFIQUE—CNRS, Paris (FR)

(72) Inventors: Valérie Meille, Paris (FR); Chlóe Thieuleux, Villeurbanne (FR); Laurent Veyre, Jardin (FR); Iurii Suleimanov, Villeurbanne (FR); Thomas Galeandro-Diamant, Villeurbanne (FR); Magali Bousquie, Lyons (FR)

(73) Assignees: ELKEM SILICONES FRANCE SAS, Lyons (FR); UNIVERSITE CLAUDE BERNARD LYON I, Villeurbanne (FR); CPE LYON FORMATION CONTINUE ET RECHERCHE—CPE LYON CFR, Villeurbanne (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 0 days.

(21) Appl. No.: 18/123,609

(22) Filed: Mar. 20, 2023

(65) Prior Publication Data

US 2023/0264183 A1 Aug. 24, 2023

Related U.S. Application Data

(62) Division of application No. 16/961,643, filed as application No. PCT/FR2019/050054 on Jan. 11, 2019, now Pat. No. 11,633,728.

(30) Foreign Application Priority Data

Jan. 12, 2018 (FR) ...................... 1850246

(51) Int. Cl.
| | | |
|---|---|---|
| *B01J 35/00* | (2024.01) | |
| *B01J 31/16* | (2006.01) | |
| *B01J 31/20* | (2006.01) | |
| *B01J 35/02* | (2006.01) | |
| *B01J 35/23* | (2024.01) | |
| *B01J 35/40* | (2024.01) | |
| *B82Y 30/00* | (2011.01) | |
| *B82Y 40/00* | (2011.01) | |

(52) U.S. Cl.
CPC ........... *B01J 35/23* (2024.01); *B01J 31/1608* (2013.01); *B01J 31/20* (2013.01); *B01J 35/40* (2024.01); *B01J 2531/842* (2013.01); *B01J 2531/845* (2013.01); *B01J 2531/847* (2013.01); *B82Y 30/00* (2013.01); *B82Y 40/00* (2013.01)

(58) Field of Classification Search
CPC ...... B01J 35/023; B01J 35/0013; B01J 31/20; B01J 31/1608; B82Y 30/00
See application file for complete search history.

(56) References Cited

U.S. PATENT DOCUMENTS

| | | | |
|---|---|---|---|
| 4,252,672 A | 2/1981 | Smith | |
| 4,252,674 A | 2/1981 | Smith | |
| 4,705,765 A | 11/1987 | Lewis | |
| 9,421,532 B2 * | 8/2016 | Nagashima | ........... C07F 7/0805 |
| 2009/0215615 A1 | 8/2009 | Mao et al. | |
| 2009/0286899 A1 | 11/2009 | Hofmann et al. | |

FOREIGN PATENT DOCUMENTS

| | | |
|---|---|---|
| EP | 2963047 A1 | 1/2016 |
| JP | H07-316175 A | 12/1995 |
| WO | 2008/008664 A1 | 1/2008 |
| WO | 2009150173 A1 | 12/2009 |

OTHER PUBLICATIONS

Nesmeyanov et al., "Addition Substitution and Telomerization Reactions of Olefins in the Presence of Metal Carbonyls or Colloidal Iron," 17 Tetrahedron 61 (Pregamon Press, Ltd. 1962).
Baudouin et al., "Nickel-Silicide Colloid Prepared Under Mild Conditions as a Versatile Ni Precursor for More Efficient CO2 Reforming of CH4 Catalysts," 134 J. Am. Chem. Soc'y 20624 (2012).
Sims et al., "The Effect of Metallic Sols in Delaying Detonation in Internal Combustion Engines," 22 Trans. Faraday Soc'y 363 (1926).
Dahal et al., "Phase-Controlled Synthesis of Iron Silicide (Fe3Si and Fe2Si2) Nanoparticles in Solution," 22 Chem. Mater. 2892 (2010).
Baudouin et al., J of the American Chemical Society. (2012), v. 134, p. 20624-20627.

* cited by examiner

Primary Examiner — Yong L Chu
(74) Attorney, Agent, or Firm — WHDA, LLP

(57) ABSTRACT

Nanoparticles that can be used as hydrosilylation and dehydrogenative silylation catalysts. The nanoparticles have at least one transition metal with an oxidation state of 0, chosen from the metals of columns 8, 9 and 10 of the periodic table, and at least one carbonyl ligand, preferably a silicide.

9 Claims, 9 Drawing Sheets

NANOPARTICLES OF CO COMPLEXES OF ZERO-VALENT METALS THAT CAN BE USED AS HYDROSILYLATION AND DEHYDROGENATIVE SILYLATION CATALYSTS

FIELD OF THE INVENTION

The invention relates to nanoparticles that can be used as catalysts, in particular as bydrosilylation and dehydrogenative silylation catalysts. More specifically, the present invention relates to nanoparticles comprising at least one transition metal with an oxidation state of 0, chosen from the metals of columns 8, 9 and 10 of the periodic table, and at least one carbonyl ligand.

TECHNOLOGICAL BACKGROUND

During a hydrosilylation reaction (also called polyaddition), a compound comprising at least one unsaturation reacts with a compound comprising at least one hydrogenosilyl function, i.e. a hydrogen atom bonded to a silicon atom. This reaction can for example be described in the case of an unsaturation of the alkene type by:

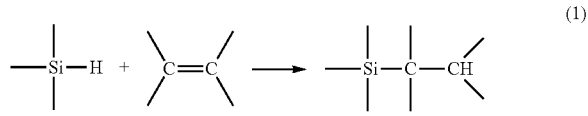

(1)

or in the case of an unsaturation of the alkyne type by:

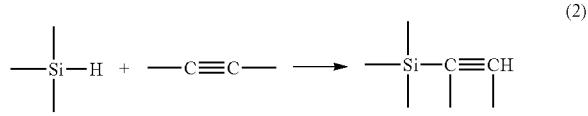

(2)

During a dehydrogenative silylation reaction, the reaction can be described by:

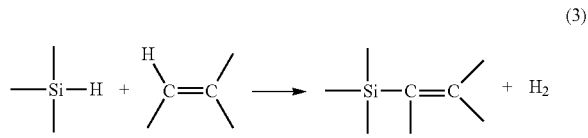

(3)

The hydrosilylation of unsaturated compounds is carried out by catalysis. Typically, the suitable catalyst for this reaction is a platinum catalyst. Currently, most industrial hydrosilylation reactions are catalysed by the Karstedt platinum complex, having the general formula $Pt_2$(divinyltetramethyldisiloxane)$_3$ (or in shortened form $Pt_2(DVTMS)_3$):

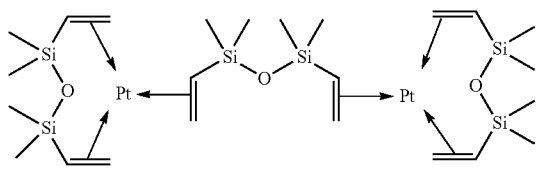

However, this type of catalyst is relatively unstable and changes over the course of the reaction by forming colloidal species of Pt(0), of which the size is not controlled, which leads to a coloration of the reaction medium and of the oil obtained ranging from yellow to black.

In this context, it would therefore be interesting to access effective alternative catalysts, of which the preparation, implementation and activity can be reproduced, for hydrosilylation or dehydrogenative silylation reactions.

One of the objectives of the present invention is therefore to propose a catalyst, adapted in particular for the catalysis of hydrosilylation and dehydrogenative silylation reactions, that is effective.

Another objective of the invention is to provide a method of hydrosilylation implementing a catalyst that is effective.

BRIEF DESCRIPTION OF THE INVENTION

These objectives are achieved thanks to the implementation of nanoparticles comprising at least one transition metal with an oxidation state of 0, chosen from the metals of columns 8, 9 and 10 of the periodic table, and at least one carbonyl ligand, as a hydrosilylation or dehydrogenative silylation catalyst.

Thus, the present invention has for object nanoparticles comprising:
at least one transition metal with an oxidation state of 0, chosen from the metals of columns 8, 9 and 10 of the periodic table, and
at least one carbonyl ligand.

The invention also has for object a colloidal suspension comprising nanoparticles.

The invention also has for object a catalyst comprising nanoparticles or a colloidal suspension comprising nanoparticles.

The invention also has for object a method for preparing nanoparticles and/or a colloidal suspension comprising nanoparticles.

The invention also has for object a method of hydrosilylation catalysed by nanoparticles or a colloidal suspension comprising nanoparticles.

DETAILED DESCRIPTION OF THE INVENTION

Definitions

Figure 1A:
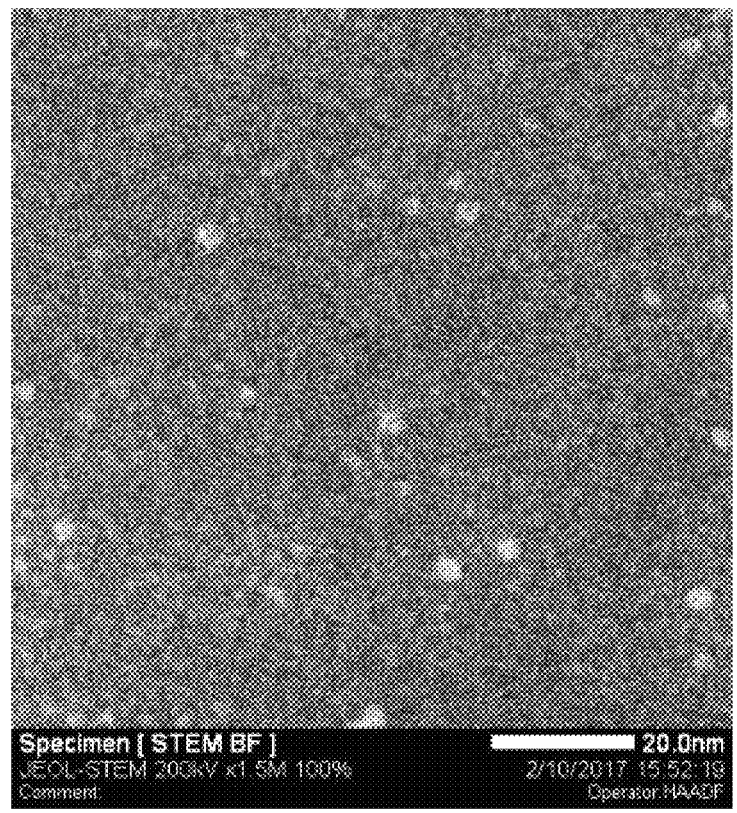
FIG. 1A shows a HAADF STEM photo of the colloidal solution comprising iron nanoparticles according to example 1.

"Silane" means in the present invention the chemical compounds comprising a silicon atom bonded to four hydrogen atoms or to organic substituents. "Polysilane" means in the present invention the chemical compounds having at least one unit ≡Si—Si≡.

"Hydrogenosilane" means in the present invention the chemical compounds belonging to the group of silanes, comprising therefore at least one silicon atom, and comprising at least one hydrogen atom bonded to the silicon atom.

"Organopolysiloxane" means in the present invention the chemical compounds having at least one unit ≡Si—O—Si≡.

"Alkyl" means a hydrocarbon chain, linear or branched, comprising from 1 to 40 carbon atoms, preferably from 1 to 20 carbon atoms, more preferably from 1 to 10 carbon atoms. An alkyl group can be chosen from the group consisting of methyl, ethyl, isopropyl, n-propyl, tert-butyl, isobutyl, n-butyl, n-pentyl, isoamyl and 1,1-dimethylpropyl.

"Cycloalkyl" means according to the invention a monocyclic or polycyclic saturated hydrocarbon group, preferably monocyclic or bicyclic, containing from 3 to 20 carbon atoms, preferably from 5 to 8 carbon atoms. When the cycloalkyl group is polycyclic, the multiple cyclic cores can be attached to one another by a covalent bond and/or by a spiro atom and/or be condensed to one another. A cycloalkyl group can be chosen from the group consisting of cyclopropyl, cyclobutyl, cyclopentyl, cyclohexyl, cycloheptyl, cyclooctyl, adamantane and norborane.

"Aryl" means according to the invention an aromatic hydrocarbon group containing from 5 to 18 carbon atoms, monocyclic or polycyclic. An aryl group can be chosen from the group consisting of phenyl, naphthyl, anthracenyl and phenanthryl.

"Halogen atom" means according to the invention an atom chosen from the group consisting of fluorine, chlorine, bromine and iodine.

"Heteroaryl" means according to the invention an aryl group wherein at least one carbon atom has been substituted with a heteroatom chosen from O, N, S and P. A heteroaryl group can be chosen from the group consisting of pyranyl, furanyl, pyridinyl, pyrimidinyl, pyrrolyl, pyrazolyl, imidazolyl, isothiazolyl, isoxazolyl and indolyl.

"Heterocycloalkyl" means according to the invention a cycloalkyl group wherein at least one carbon atom has been substituted with a heteroatom chosen from O, N, S and P, Preferably the heterocycloalkyl comprises from 5 to 10 members. A heterocycloalkyl group can in particular be the monocyclic oxiranyl group or the bicyclic epoxycyclohexyl group.

"Alkoxy" means according to the invention an alkyl group such as defined hereinabove bonded to an oxygen atom. An alkoxy group can be chosen from the group consisting of methoxy, ethoxy, propoxy and butoxy.

"Aryloxy" means according to the invention an aryl group such as defined hereinabove bonded to an oxygen atom. An aryloxy group can be for example the phenoxy group.

"Cycloalkoxy" means according to the invention a cycloalkyl group such as defined hereinabove bonded to an oxygen atom.

"Alkylsilyl" means according to the invention an alkyl group such as defined hereinabove bonded to a silicon atom.

"Alkoxysilyl" means according to the invention an alkoxy group such as defined hereinabove bonded to a silicon atom.

Nanoparticles

The present invention has for object nanoparticles comprising:
at least one transition metal with an oxidation state of 0, chosen from the metals of columns 8, 9 and 10 of the periodic table, and
at least one carbonyl ligand.

In the present invention, the metals of columns 8, 9 and 10 of the periodic table are preferably iron (Fe), ruthenium (Ru), osmium (Os), cobalt (Co), rhodium (Rh), iridium (Ir), nickel (Ni), palladium (Pd) and platinum (Pt). Preferably, the nanoparticles include at least one metal chosen from the group consisting of Fe, Ru, Os, Co, Rh, Ir, Ni, Pd and Pt, and more preferably in the group consisting of Fe, Co and Ni, or in the group consisting of Fe and Co.

The nanoparticles can also include several metals chosen from the metals of columns 8, 9 and 10 of the periodic table. The nanoparticles can, for example, include 2 or 3 metals. It is thus possible to have bimetallic or trimetallic nanoparticles, such as nanoparticles comprising the metals Fe and Co, or the metals Fe and Ni, or the metals Co and Ni, or nanoparticles comprising the metals Fe, Co and Ni. The metal or metals contained in the nanoparticles are with an oxidation state of 0.

The nanoparticles also comprise at least one carbonyl ligand (CO). This carbonyl ligand is coordinated with at least one metal atom of columns 8, 9 or 10 of the periodic table. This ligand can be coordinated at the surface of the nanoparticles. The presence of the carbonyl ligand can be determined by infrared spectroscopy (IR), or by $^{13}$C-NMR.

Advantageously, the nanoparticles also comprise at least one silicide. In the present invention, "silicide" means the chemical compounds comprising a silicon atom bonded to at least one metal atom chosen from the metals of columns 8, 9 and 10 of the periodic table. Preferably, the silicide also comprises at least one Si—C bond. The silicide can be chosen from compounds having formula (I):

$$Y_pZ^4_qSiH_r \qquad (I)$$

wherein:
the symbol(s) Y, identical or different, represent a metal chosen from the metals of columns 8, 9 and 10 of the periodic table, preferably a metal chosen from Fe. Co and Ni, and more preferably Fe and Co;
the symbol(s) $Z^4$, identical or different, represent a monovalent hydrocarbon group having from 1 to 18 carbon atoms inclusive optionally substituted with heteroatoms or with radicals comprising heteroatoms, and preferably chosen from the group consisting of alkyl groups having from 1 to 18 carbon atoms inclusive and aryl groups having from 6 to 12 carbon atoms, and more preferably chosen from the group consisting of alkyl groups having 4 to 12 carbon atoms inclusive;
p=1, 2 or 3;
q=1, 2 or 3, preferably q=1;
r=0, 1 or 2;
p+q+r=4.

The symbol(s) $Z^4$, identical or different, can represent a linear alkyl group having 4 to 12 carbon atoms inclusive. Among the linear alkyl groups having 4 to 12 carbon atoms inclusive, mention can be made of n-butyl, n-pentyl, n-hexyl, n-heptyl, n-octyl, n-nonyl, n-decyl, n-undecyl, n-dodecyl.

According to an embodiment, q=1 and the symbol $Z^4$ represents an n-octyl group.

The size of the nanoparticles can be variable. Preferably, the nanoparticles have an average diameter less than or equal to 50 nm, or less than or equal to 10 nm. More preferably, the nanoparticles have an average diameter less than or equal to 10 nm, or less than or equal to 5 nm, or less than or equal to 3 nm. The average diameter can be comprised between 0.5 and 10 nm, or between 0.5 and 5 nm, or between 0.75 and 3 nm. The average diameter of the nanoparticles can, for example, be determined by transmission electron microscopy.

According to an embodiment, the nanoparticles have an average diameter less than or equal to 10 nm, and comprise:
at least one metal chosen from the metals of columns 8, 9 and 10 of the periodic table;
at least one carbonyl ligand, and
at least one silicide.

According to an embodiment, the nanoparticles have an average diameter less than or equal to 5 nm, and comprise:
at least one metal chosen from Fe, Co and Ni;
at least one carbonyl ligand, and
at least one silicide chosen from compounds having formula (I):

$$Y_p Z^4_q SiH_r \quad (I)$$

wherein:
the symbol(s) Y, identical or different, represent a metal chosen from the metals of columns 8, 9 and 10 of the periodic table, preferably a metal chosen from Fe, Co and Ni;
the symbol(s) $Z^4$, identical or different, represent a monovalent hydrocarbon group having from 1 to 18 carbon atoms inclusive optionally substituted with heteroatoms or with radicals comprising heteroatoms, and preferably chosen from the group consisting of alkyl groups having from 1 to 18 carbon atoms inclusive and aryl groups having from 6 to 12 carbon atoms, and more preferably chosen from the group consisting of alkyl groups having 4 to 12 carbon atoms inclusive;
p=1, 2 or 3;
q=1, 2 or 3, preferably q=1;
r=0, 1 or 2;
p+q+r=4.

Advantageously, the nanoparticles are not paramagnetic.

According to an embodiment, the nanoparticles have an average diameter less than or equal to 50 nm, and comprise:
at least one metal chosen from the metals of columns 8, 9 and 10 of the periodic table;
at least one carbonyl ligand, and
at least one silicide, preferably silicide chosen from compounds having formula (I):

$$Y_p Z^4_q SiH_r \quad (I)$$

wherein:
the symbol(s) Y, identical or different, represent a metal chosen from the metals of columns 8, 9 and 10 of the periodic table, preferably a metal chosen from Fe, Co and Ni;
the symbol(s) $Z^4$, identical or different, represent a monovalent hydrocarbon group having from 1 to 18 carbon atoms inclusive optionally substituted with heteroatoms or with radicals comprising heteroatoms, and preferably chosen from the group consisting of alkyl groups having from 1 to 18 carbon atoms inclusive and aryl groups having from 6 to 12 carbon atoms, and more preferably chosen from the group consisting of alkyl groups having 4 to 12 carbon atoms inclusive;
p=1, 2 or 3;
q=1, 2 or 3, preferably q=1;
r=0, 1 or 2;
p+q+r=4.

The invention also has for object a colloidal suspension comprising nanoparticles such as described hereinabove. The nanoparticles can be in suspension in an organic solvent, preferably an aprotic solvent. The solvent can be chosen from the group consisting of:
aromatics, preferably toluene,
alkanes, preferably pentane,
ethers, preferably THF,
and mixtures thereof.

The nanoparticles can also be in suspension in a silicone oil, preferably a silicone oil that has a dynamic viscosity less than or equal to 100,000 mPa·s at 25° C.

The nanoparticles can be placed in suspension in a silicone oil in the following manner
adding of a silicone oil in a colloidal suspension comprising nanoparticles and an organic solvent, and
evaporation of the organic solvent.

This colloidal suspension can have a concentration in starting metal comprised between 1 and 100 μmol/mL, preferably between 10 and 50 μmol/mL.

The invention also has for object a catalyst comprising nanoparticles of transition metals with an oxidation state of 0 such as described hereinabove or a colloidal suspension such as described hereinabove. This catalyst can be a hydrosilylation and/or dehydrogenative silylation catalyst. This catalyst can also be an alkene isomerisation catalyst.

The invention also has for object the use of nanoparticles of transition metals with an oxidation state of 0 such as described hereinabove or a colloidal suspension such as described hereinabove as a catalyst, preferably as a hydrosilylation and/or dehydrogenative silylation and/or alkene isomerisation catalyst.

Method for Preparing Nanoparticles

The invention also has for object a method for preparing nanoparticles or a colloidal suspension comprising nanoparticles. This method comprises a step of mixing at least one metal complex, chosen from the transition metal carbonyls of columns 8, 9 and of the periodic table, with at least one silane in a solvent, under inert atmosphere and/or under hydrogen.

The silane will react with the metal complex to form a silicide. The metal complex is chosen from the transition metal carbonyls of columns 8, 9 and 10 of the periodic table, it is therefore a complex of a transition metal chosen from the metals of columns 8, 9 and 10 of the periodic table comprising at least one carbonyl ligand. Preferably, it is an iron, cobalt or nickel carbonyl, among which mention can be made of: $Fe_3(CO)_{12}$, $Fe_2(CO)_9$, $Fe(CO)_5$, $Co_2(CO)_8$, $Co_4$

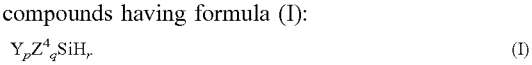

$(CO)_{12}$ and $Ni(CO)_4$. Advantageously, the metal complex is chosen from the iron or cobalt carbonyls.

It is also possible to use several different metal complexes, for example if it is desired to synthesise bimetallic or trimetallic nanoparticles.

Advantageously, the silane comprises at least one Si—C bond and at least one Si—H bond. This is preferably a silane having formula (0):

$$Z^4_q SiH_{(4-q)} \tag{II}$$

wherein $Z^4$ and q have the same meaning as hereinabove.

The quantity of silane used in the method is at least 0.01 molar equivalents with respect to the metal comprised in the metal complex implemented. This quantity can be comprised between 0.01 and 5 molar equivalents with respect to the metal comprised in the metal complex implemented. Preferably, this quantity is comprised between 0.01 and 1, and more preferably, between 0.05 and 0.5 molar equivalents with respect to the metal comprised in the metal complex implemented. The quantity of silane can have an influence on the size of the nanoparticles. Advantageously, to prepare nanoparticles having an average diameter less than or equal to 50 nm, or a colloidal suspension comprising such nanoparticles, the quantity of silane is comprised between 0.01 and 1 molar equivalent in relation to the metal comprised in the metal complex, preferably between 0.05 and 0.5 molar equivalents.

The solvent is an organic solvent, preferably an aprotic solvent. The solvent can be chosen from the group consisting of:
  aromatics, preferably toluene,
  alkanes, preferably pentane,
  ethers, preferably THF,
  and mixtures thereof.

The method for preparing nanoparticles is carried out under an inert atmosphere and/or under hydrogen. "inert atmosphere" means a non-reactive gas in the reaction conditions. Among the non-reactive gases, mention can be made of dinitrogen and the noble gases (helium, argon, krypton and xenon). According to an embodiment of the method, the method is carried out under dinitrogen or under argon.

According to an embodiment of the method, the mixing step is carried out at a temperature less than 140° C., preferably comprised between 1° and 135° C., between 1° and 120° C., or between 1° and 90° C. According to an embodiment of the method for preparing nanoparticles, the mixing step is carried out at room temperature.

According to an embodiment of the method for preparing nanoparticles, the mixing step is carried out under a hydrogen pressure comprised between 1 and 10 bars, preferably, between 1 and 5 bars.

According to an embodiment of the method for preparing nanoparticles, the step of mixing lasts at least 30 minutes, preferably between 1 and 25 hours. According to an embodiment of the method, the step of mixing lasts at least 15 hours, preferably, between and 25 hours.

The invention also has for object nanoparticles and/or a colloidal suspension comprising nanoparticles able to be obtained by the method described hereinabove.

Method of Hydrosilylation

The present invention also has for object a method for preparing hydrosilylation and/or dehydrogenative silylation products by reaction
  between an unsaturated compound A. and
  a compound B comprising at least one hydrogenosilyl function,
said method being characterised by the fact that it is catalysed by nanoparticles and/or a colloidal suspension comprising nanoparticles such as described hereinabove.

The unsaturated compound A according to the invention is a compound comprising at least one unsaturation that is not part of an aromatic cycle. Compound A comprises in particular at least one alkene function and/or an alkyne function. Any compound that comprises at least one alkene function and/or an alkyne function can be used in the method according to the invention, in that it does not contain any reactive chemical function that can hinder, even prevent the hydrosilylation reaction.

According to an embodiment, compound A comprises one or more alkene functions and from 2 to 40 carbon atoms. It can further comprise 1 to 20 heteroatoms chosen from N, P, O, S, F, Cl, Br and I. When compound A comprises several alkene functions, the latter can be conjugated or not.

According to another embodiment, compound A comprises one or more alkyne functions and from 2 to 40 carbon atoms. It can further comprise 1 to 20 heteroatoms chosen from N, P, O, S, F, Cl, Br and I. When compound A comprises several alkyne functions, the latter can be conjugated or not.

Compound A can be chosen from compounds having formula (III) or (IV):

wherein:
  $R^1$, $R^2$, $R^1$ and $R^4$ represent, independently of one another,
    a hydrogen atom;
    a halogen atom chosen from fluorine, chlorine, bromine and iodine;
    an alkyl group;
    a cycloalkyl group;
    an aryl group;
    a heteroaryl group;
    a heterocycloalkyl group;
    an alkoxy group;
    an aryloxy group;
    a cycloalkoxy group;
    an alkylsilyl group;
    an alkoxysilyl group;
    a carboxylic acid group;
    an alkylic esters group;
    a urea group;
    an amide group;
    a sulfonamide group;
    an imide group;
    a cyano group;
    an aldehyde group;
    an alcohol group;
    a thiol group;
    an amine group;
    an imine group;
    a sulphide group;
    a sulphoxide group;
    a sulfone group;
    an azide group;

an allyl phosphonate group; or
an allyl phosphate group;
these groups are able themselves to be substituted on their alkyl and/or cycloalkyl and/or aryl portion(s) with:
one or more C1 to C8 alkyl groups, optionally halogenated;
one or more C1 to C8 alkoxy groups, optionally halogenated;
one or more aryl groups, optionally halogenated;
one or more halogen atoms;
one or more carboxylic acid groups;
one or more ester groups;
one or more ether groups;
one or more urea groups;
one or more amide groups;
one or more sulfonamide groups;
one or more imide groups;
one or more cyano groups;
one or more aldehyde groups;
one or more ketone function groups;
one or more alcohol groups;
one or more thiol groups;
one or more amine groups;
one or more imine groups;
one or more sulphide groups;
one or more sulphoxide groups;
one or more sulfone groups;
one or more azide groups;
one or more phosphate groups; and/or
one or more phosphonate groups;
or
at least two groups chosen from $R^1$, $R^2$, $R^3$ and $R^4$ form together with the carbon atoms to which they are bonded one or more cycloalkyl, heterocycloalkyl, aryl or heteroaryl groups, these groups, cycloalkyl, heterocycloalkyl, aryl and heteroaryl able to be substituted with one or more C1 to C8 alkyl groups, optionally halogenated; with one or more C1 to C8 alkoxy groups, optionally halogenated; with one or more aryl groups, optionally halogenated; with one or more halogen atoms; with one or more carboxylic acid groups; with one or more ester groups; with one or more ether groups, with one or more urea groups; with one or more amide groups; with one or more sulfonamide groups; with one or more imide groups; with one or more cyano groups; with one or more aldehyde groups; with one or more ketone functions; with one or more alcohol groups; with one or more thiol groups; with one or more amine groups; with one or more imine groups; with one or more sulphide groups; with one or more sulphoxide groups; with one or more sulfone groups; with one or more azide groups; with one or more phosphate groups; and/or with one or more phosphonate groups:
the remaining groups among $R^1$, $R^2$, $R^3$ and $R^4$ being such as defined hereinabove,
and mixtures thereof.
Preferably, $R^1$, $R^2$, $R^3$ and $R^4$ represent, independently of one another
a hydrogen atom;
a C1 to C16 alkyl group, optionally substituted with a hydroxy group or a halogen atom;
a phenyl, optionally substituted with a C1 to C4 alkyl group, with a halogen, with a C1 to C4 alkyl group itself substituted with one or more halogens, with a C1 to C4 alkoxy group or with an amine function optionally substituted one or two times with a C1 to C4 alkyl group;
a pyridine;
a C1 to C8 alkylic ester;
a cyano function;
a carboxylic acid function;
a C1 to C4 acyloxy group, in particular acetyloxy;
a primary amide group, in particular unsubstituted on the nitrogen or substituted one or two times with a C1 to C4 alkyl group; or
a polyethoxyl alkyl group, optionally substituted with a hydroxy or a ketone.

Advantageously, $R^1$ can be a hydrogen atom, and $R^3$ can represent a substituent different from a hydrogen atom. In the case of a compound having formula (I), $R^2$ and $R^4$ can furthermore be hydrogen atoms.

Preferably, compound (A) can also be chosen from the group consisting of:
C1 to C4 alkyl acrylates and methacrylates;
acrylic acid or methacrylic acid;
acetylene;
alkenes, preferably octene and more preferably 1-octene;
non-conjugated dienes and preferably hexadiene or octadiene;
allylic alcohol;
allylamine;
ether glycidyl allyl;
allyl and piperidine ether and preferably allyl and piperidine ether sterically hindered allyl and piperidine ether;
styrene and preferably alpha-methyl-styrene;
1,2-epoxy-4-vinylcyclohexane;
chlorinated alkenes and preferably allyl chloride;
fluorinated alkenes and preferably 4,4,5,5,6,6,7,7,7-nonafluoro-1-heptene,
and mixtures thereof.

Compound (A) can also be chosen from the compounds comprising several alkene functions, preferably two or three alkene functions, and particularly preferably chosen from the following compounds:

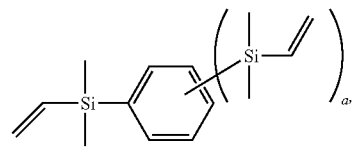

with p equaling 1 or 2,

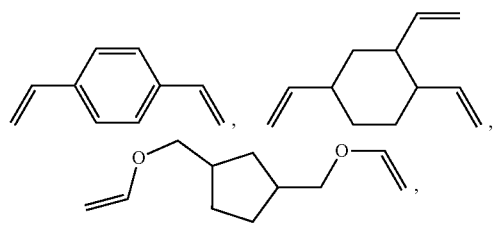

and mixtures thereof.

It is also possible in the framework of the invention to have a mixture of aforementioned compounds (A) comprising an alkene function and of aforementioned compounds (A) comprising several alkene functions.

Compound (A) can therefore also comprise chemical functions that make it possible to chemically modify the compound obtained following the hydrosilylation reaction.

The hydrosilylation of compounds that comprise both one or more double ethylenic bonds and one or more triple acetylenic bonds is also considered in the framework of the invention.

According to a preferred embodiment, the unsaturated compound A is chosen from the organopolysiloxane compounds including units having formula (V):

wherein:
the Z radicals, identical or different, represent an alkenyl or alkynyl radical, linear or branched, having from 2 to 6 carbon atoms;
the U radicals, identical or different, represent a hydrocarbon radical having from 1 to 12 carbon atoms,
g=1 or 2, h=0, 1 or 2 and g+h=1, 2 or 3;
and including optionally other units having formula (VI):

wherein U has the same meaning as hereinabove, and i=0, 1, 2, or 3.

It is understood in the formula (V) and in the formula (VI) hereinabove that, if several U groups are present, they can be identical or different from one another. In the formula (V), the symbol g can preferably be equal to 1.

In the formula (V) and in the formula (VI), U can represent a monovalent radical chosen from the group consisting of alkyl groups having 1 to 8 carbon atoms, optionally substituted with at least one halogen atom such as chlorine or fluorine, the cycloalkyl groups having from 3 to g carbon atoms and the aryl groups having from 6 to 12 carbon atoms. U can advantageously be chosen from the group consisting of methyl, ethyl, propyl, 3,3,3-trifluoropropyl, xylyl, tolyl and phenyl.

Said organopolysiloxanes can be oils with a dynamic viscosity of about from 10 to 100,000 mPa·s at 25° C., generally of about from 10 to 70,000 mPa·s at 25° C., or gums with a dynamic viscosity of about from 1,000,000 mPa·s or more at 25° C.

All of the viscosities concerned in the present disclosure correspond to a magnitude of dynamic viscosity at 25° C. referred to as "Newtonian", i.e. the dynamic viscosity which is measured, in a manner known per se, with a Brookfield viscosimeter with a shear velocity gradient that is low enough for the viscosity measured to be independent of the velocity gradient.

These organopolysiloxanes can have a linear, branched or cyclic structure. Their degree of polymerisation is, preferably, comprised between 2 and 5000.

When this entails linear polymers, the latter are substantially consisted of "D" siloxyl units chosen from the group consisting of the siloxyl units $Z_2SiO_{2/2}$, $ZUSiO_{2/2}$ and $U_2SiO_{2/2}$, and of "M" siloxyl units chosen from the group consisting of the siloxyl units $ZU_2SiO_{1/2}$, $Z_2USiO_{1/2}$ and $Z_3SiO_{1/2}$. The symbols Z and U are such as described hereinabove.

As examples of "M" terminal units, mention can be made of the trimethylsiloxy, dimethylphenylsiloxy, dimethylvinylsiloxy or dimethylhexenylsiloxy groups.

With regards to examples of "D" units, mention can be made of the dimethylsiloxy, methylphenylsiloxy, methylvinylsiloxy, methylbutenylsiloxy, methylhexenylsiloxy, methyldecenylsiloxy or methyldecadienylsiloxy groups.

Examples of linear organopolysiloxanes that can be unsaturated compounds A according to the invention are:
a poly(dimethylsiloxane) with dimethylvinylsilyl ends;
a poly(dimethylsiloxane-co-methylphenylsiloxane) with dimethyl-vinylsilyl ends;
a poly(dimethylsiloxane-co-methylvinylsiloxane) with dimethyl-vinylsilyl ends; and
a poly(dimethylsiloxan-co-methylvinylsiloxane) with trimethyl-silyl ends; and
a cyclic poly(methylvinylsiloxane).

The cyclic organopolysiloxanes that can also be unsaturated compounds A according to the invention are for example, those consisted of "D" siloxyl units having the following formulas: $Z_2SiO_{2/2}$, $U_2SiO_{2/2}$ or $ZUSiO_{2/2}$, which can be of the dialkylsiloxy, alkylarylsiloxy, alkylvinylsiloxy, alkylsiloxy type. Said cyclic organopolysiloxanes have a viscosity of about from 10 to 5,000 mPa·s at 25° C.

According to another embodiment, it is possible to implement in the method according to the invention a second organopolysiloxane compound including, per molecule, at least two $C_2$-$C_6$ alkenyl radicals bonded to silicon atoms, different from the organopolysiloxane compound A, said second organopolysiloxane compound being preferably divinyltetramethylsiloxane (DVTMS).

Preferably, the organopolysiloxane compound A has a mass content in Si-vinyl units comprised between 0.001 and 30%, preferably between 0.01 and 10%.

As other examples of unsaturated compounds A mention can be made of the silicone resins comprising at least one vinyl radical. For example they can be chosen from the group consisting of the following silicone resins:
$MD^{Vi}Q$ where the vinyl groups are included in the units D,
$MD^{Vi}TQ$ where the vinyl groups are included in the units D,
$MM^{Vi}Q$ where the vinyl groups are included in a portion of the units M,
$MM^{Vi}TQ$ where the vinyl groups are included in a portion of the units M,
$MM^{Vi}DD^{Vi}Q$ where the vinyl groups are included in a portion of the units M and D,
and mixtures thereof,
with:
$M^{Vi}$=siloxyl unit having formula $(R)_2(vinyl)SiO_{1/2}$
$D^{Vi}$=siloxyl unit having formula $(R)(vinyl)SiO_{2/2}$
T=siloxyl unit having formula $(R)SiO_{3/2}$
Q=siloxyl unit having formula $SiO_{4/2}$
M siloxyl unit having formula $(R)_3SiO_{1/2}$
D=siloxyl unit having formula $(R)_2SiO_{2/2}$
and the R groups, identical or different, are monovalent hydrocarbon groups chosen from the alkyl groups having from 1 to 8 carbon atoms inclusive such as the methyl, ethyl, propyl and 3,3,3-trifluoropropyl groups and the aryl groups such xylyl, tolyl and phenyl. Preferably, the R groups are methyls.

The method according to the invention also implements a compound B comprising at least one hydrogenosilyl function, i.e. at least one hydrogen atom directly bonded to a silicon atom (or at least one Si—H group).

Preferably, compound B comprising at least one hydrogenosilyl function is chosen from the group consisting of:
a hydrogenosilane compound,
an organopolysiloxane compound comprising at least one hydrogen atom bonded to a silicon atom, preferably an organopolysiloxane compound comprising per molecule at least two hydrogenosilyl functions, and an organic polymer comprising hydrogenosilyl functions in terminal positions.

Preferably, the silicon atoms of the compounds (B) are bonded to more than one hydrogen atom.

Compound (B) can be a hydrogenosilane compound. Preferably, the hydrogenosilane compound according to the invention comprises less than 5 silicon atoms.

Any hydrogenosilane compound can be used in the method according to the invention, in that it does not contain any reactive chemical function that can hinder, even prevent the hydrosilylation reaction.

According to an embodiment of the present invention, the hydrogenosilane compound can be chosen from compounds having formula (VII):

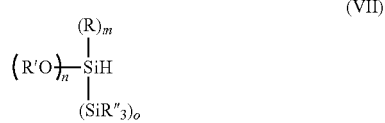

(VII)

wherein:
- R represents, independently of one another, a hydrogen atom; a halogen atom, preferably chlorine; an alkyl group optionally substituted with one or more aryl or cycloalkyl groups, with one or more halogen atoms and/or with one or more ketone functions; a cycloalkyl group optionally substituted with one or more alkyl groups and/or with one or more halogen atoms; or an aryl group optionally substituted with one or more alkyl groups and/or with one or more halogen atoms;
- R' represents, independently of one another, an alkyl group optionally substituted with one or more aryl or cycloalkyl groups, with one or more halogen atoms and/or with a ketone function; a cycloalkyl group optionally substituted with one or more alkyl groups and/or with one or more halogen atoms; or an aryl group optionally substituted with one or more alkyl groups and/or with one or more halogen atoms;
- R" represents, independently of one another, a hydrogen atom; a halogen atom, preferably chlorine; an alkyl group optionally substituted with one or more aryl or cycloalkyl groups and/or with one or more halogen atoms; a cycloalkyl group optionally substituted with one or more alkyl groups and/or with one or more halogen atoms; or an aryl group optionally substituted with one or more alkyl groups and/or with one or more halogen atoms; and
- m, n and o are integers equaling 0, 1, 2 or 3, and m+n+o=3, R, R' and R" being identical or different, and mixtures thereof.

The hydrogenosilane compound can be chosen from compounds having formula (VII) wherein the symbols m=0, n=0 and o=3, and R" represent a hydrogen atom, a halogen atom, preferably chlorine, a C1 to C8 linear or branched alkyl group or an aryl group.

Among the hydrogenosilanes, mention can be made of tris(trimethylsilyl)silane, phenylsilane and triethoxysilane.

Alternatively, the hydrogenosilane compound can be chosen from compounds having formula (VII) wherein the symbols m=3, n=0 and o=0, and R represent a hydrogen atom, a halogen atom, preferably chlorine, a C1 to C8 linear or branched alkyl group or an aryl group.

Compound B can also be an organopolysiloxane compound comprising at least one hydrogen atom bonded to a silicon atom. The organopolysiloxane compound comprises at least two silicon atoms, preferably at least 3 silicon atoms or more.

Said compound B can advantageously be an organopolysiloxane comprising at least one unit having formula (VIII):

(VIII)

wherein:
- the U radicals, identical or different, represent a hydrocarbon radical having from 1 to 12 carbon atoms,
- d=1 or 2, e=0, 1 or 2 and d+e=1, 2 or 3;

and optionally other units having formula (IX):

(IX)

wherein U has the same meaning as hereinabove, and f=0, 1, 2, or 3.

It is understood in the formula (VII) and in the formula (IX) hereinabove that, if several U groups are present, they can be identical or different from one another. In the formula (VIII), the symbol d can preferably be equal to 1. In addition, in the formula (VIII) and in the formula (IX), U can represent a monovalent radical chosen from the group consisting of an alkyl group having 1 to 8 carbon atoms, optionally substituted with at least one halogen atom such as chlorine or fluorine, the alkyl groups having from 1 to 8 carbon atoms, the cycloalkyl groups having from 3 to 8 carbon atoms and the aryl groups having from 6 to 12 carbon atoms. U can advantageously be chosen from the group consisting of methyl, ethyl, propyl, 3,3,3-trifluoropropyl, xylyl, tolyl and phenyl.

These organopolysiloxanes can have a linear, branched or cyclic structure. The degree of polymerisation is preferably greater than or equal to 2. More generally, it is less than 5,000.

When this entails linear polymers, the latter are substantially constituted:
- of "D" siloxyl units chosen from units having the following formulas $U_2SiO_{2/2}$ or $UHSiO_{2/2}$, and
- of "M" siloxyl units chosen from units having the following formulas $U_3SiO_{1/2}$ or $U_2HSiO_{1/2}$.

These linear organopolysiloxanes can be oils with a dynamic viscosity of about from 1 to 100,000 mPa·s at 25° C. and more generally of about from 10 to 5,000 mPa·s at 25° C.

Examples of organopolysiloxanes that can be compounds B according to the invention comprising at least one hydrogen atom bonded to a silicon atom are:
- a poly(dimethylsiloxane) with hydrogenodimethylsilyl ends;
- a poly(dimethylsiloxane-co-methylhydrogenosiloxane) with trimethyl-silyl ends;
- a poly(dimethylsiloxane-co-methylhydrogenosiloxane) with hydro-genodimethylsilyl ends;
- a poly(methylhydrogenosiloxane) with trimethylsilyl ends; and
- a cyclic poly(methylhydrogenosiloxane).

When this entails cyclic organopolysiloxanes, the latter are consisted of "D" siloxyl units of the following formulas $U_2SiO_{2/2}$ and $UHSiO_{2/2}$, which can be of the dialkylsiloxy or alkylarylsiloxy type or of $UHSiO_{2/2}$ units only. They then have a viscosity of about from 1 to 5,000 mPa·s.

Preferably, compound B is an organopolysiloxane compound comprising per molecule at least two and preferably three hydrogenosilyl functions (Si—H).

The following compounds are particularly suitable for the invention in terms of organohydrogenopolysiloxane compound B:

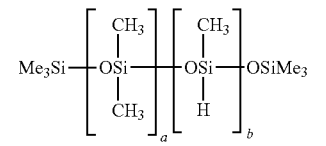

S1

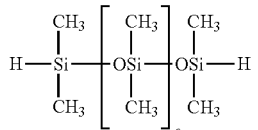

S2

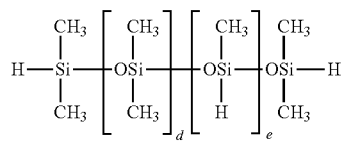

S3 with a, b, c, d and e defined hereinbelow:
in the polymer having formula S1;
 $0 \leq a \leq 150$, preferably $0 \leq a \leq 100$, and more particularly $0 \leq a \leq 20$, and
 $1 \leq b \leq 90$ preferably $10 \leq b \leq 80$ and more particularly $30 \leq b \leq 70$,
in the polymer having formula S2: $0 \leq c \leq 15$
in the polymer having formula S3: $5 \leq d \leq 200$, preferably $20 \leq d \leq 100$, and $2 \leq e \leq 90$, preferably $10 \leq e \leq 70$.

In particular, an organohydrogenopolysiloxane compound B that is suitable for the invention is the compound having formula S1, where a=0.

Preferably the organohydrogenopolysiloxane compound B has a mass content in motif SiH comprised between 0.2 and 91%, preferably between 0.2 and 50%.

Finally, compound B can be an organic polymer comprising hydrogenosilyl functions in terminal positions. The organic polymer can for example be a polyoxoalkylene, a saturated hydrocarbon polymer or a poly(meth)acrylate. Organic polymers comprising reactive functions in terminal positions re in particular described in U.S. Patent applications 2009/0182099 and US 2009/0182091.

According to a particular embodiment of the present invention, it is possible that the unsaturated compound A and compound B comprising at least one hydrogenosilyl function be a single and same compound, comprising on the one hand at least one alkene function and/or an alkyne function, and on the other hand at least one hydrogen atom bonded to a silicon atom. This compound can then be qualified as "bifunctional", and it is susceptible to react on itself by hydrosilylation reaction. The invention can therefore also relate to a method of hydrosilylation of a bifunctional compound with itself, said bifunctional compound comprising on the one hand at least one alkene function and/or an alkyne function, and on the other hand at least one silicon atom and at least one hydrogen atom bonded to the silicon atom, said method being characterised by the fact that it is catalysed by nanoparticles and/or a colloidal suspension comprising nanoparticles such as described hereinabove.

Examples of organopolysiloxanes that can be bifunctional compounds are:

a poly(dimethylsiloxane-co-hydrogenomethylsiloxane-co-vinylmethyl-siloxanes) with dimethylvinylsilyl ends:
a poly(dimethylsiloxane-co-hydrogenomethylsiloxane-co-vinylmethyl-siloxanes) with dimethylhydrogenosilyl ends; and When this entails the implementation of the unsaturated compound A and the compound B comprising at least one hydrogenosilyl function, those skilled in the art understand that the implementation of a bifunctional compound is also meant.

The method of hydrosilylation according to the present invention can be implemented at a temperature comprised between 1° and 150° C. According to an embodiment, the method of hydrosilylation is implemented at a temperature comprised between 80 to 140° C. According to another embodiment, the method of hydrosilylation is implemented at a temperature comprised between 15 and 60° C. According to an embodiment, the method of hydrosilylation is implemented at room temperature.

"Room temperature" means in the present invention a temperature comprised between 15 and 25° C.

The method of hydrosilylation according to the invention can be implemented under inert atmosphere, for example under dinitrogen.

The method of hydrosilylation according to the invention can be implemented under UV radiation.

The method according to the invention can be implemented in the presence or in the absence of solvent. According to a preferred embodiment, the method according to the invention is implemented in the absence of solvent. According to an alternative of the invention, one of the reagents, for example the unsaturated compound A, can play the role of a solvent.

In the method according to the invention, the relative quantity of compound A and of compound B can be controlled in such a way as to ensure the reaction rate of the unsaturations with desired hydrogenosilyl functions. The molar ratio R of the bydrogenosilyl functions of the compounds B over the alkene and alkyne functions of the compounds A is comprised between 0.1:5 and 5:0.1, preferably between 0.5:3 and 3:0.5, and more preferably between 1:2 and 2:1.

According to an embodiment of the method according to the invention, the molar ratio R of the hydrogenosilyl functions of the compounds B over the alkene and alkyne functions of the compounds A is strictly greater than 1. The hydrogenosilyl functions are then in excess in relation to the unsaturated functions. In this case, the method of hydrosilylation is then qualified as partial. This can also be referred to as partial functionalisation. The partial functionalisation can be used for example to obtain silicone oils with hydrogenosilyl functions and epoxy functions.

According to another embodiment, the molar ratio of the hydrogenosilyl functions of the compounds B over the alkene and alkyne functions of the compounds A is less than or equal to 1. The hydrogenosilyl functions are then lacking in relation to the unsaturated functions. This is the case when the unsaturated compound A plays the role of a solvent.

Advantageously, in the method according to the invention, the molar concentration in metal coming from the nanoparticles is from 0.001% to 10%, preferably from 0.01% to 5%, and more preferably from 0.05% to 3% in relation to the total number of moles of unsaturations carried by the unsaturated compound A.

According to an alternative, the nanoparticles of transition metals with an oxidation state of 0 include at least one metal chosen from Fe, Co and Ni, and, in the method according to the invention, compounds with a platinum, palladium, ruthenium or rhodium base are not implemented.

According to a preferred embodiment of the invention, the compounds A and B implemented are chosen from organopolysiloxanes such as defined hereinabove. In this case, a network in three dimensions is formed, which leads to the hardening of the composition. The crosslinking implies a progressive physical change in the medium that forms the composition. Consequently, the method according to the invention can be used to obtain elastomers, gels, foams etc. A crosslinked silicone material Y is obtained in this case. "Crosslinked silicone material" means any product with a silicone base obtained by crosslinking and/or hardening of compositions comprising organopolysiloxanes that have at least two unsaturated bonds and organopolysiloxanes that have at least three hydrogenosilyl units. The crosslinked silicone material Y can for example be an elastomer, a get or a foam.

Still according to this preferred embodiment of the method according to the invention, where the compounds A and B are chosen from organopolysiloxanes such as defined hereinabove, The usual functional additives can be implemented in the silicone compositions. As families of usual functional additives, mention can be made of:

fillers;

adhesion promoters;

inhibitors or retardants of the hydrosilylation reaction;

adherence modulators;

silicone resins;

additives for increasing the consistency;

pigments; and additives for thermal resistance, resistance to oils or resistance to fire, for example metal oxides.

The fillers optionally provided are more preferably mineral fillers. They can in particular be siliceous. When entailing siliceous materials, they can play the role of a reinforcing or semi-reinforcing filler. The reinforcing siliceous fillers are chosen from colloidal silicas, combustion and precipitation silica powders or the mixtures thereof. These powders have an average particle size generally less than 0.1 µm (micrometres) and a BET specific surface greater than 30 m²/g, preferably comprised between 30 and 350 m²/g. Semi-reinforcing siliceous charges such as diatomaceous earths or crushed quartz, can also be used. With regards to the non-siliceous mineral materials, they can intervene as a semi-reinforcing or stuffing mineral filler. Examples of these non-siliceous fillers that can be used alone or in a mixture are carbon black, titanium dioxide, aluminium oxide, hydrated alumina, expanded vermiculite, non-expanded vermiculite, calcium carbonate optionally surface treated with fatty acids, zinc oxide, mica, talc, iron oxide, barium sulphate and slaked lime. These fillers have a granulometry generally comprised between 0.001 and 300 µm (micrometres) and a BET surface less than 100 m²/g. In a practical but non-limiting manner, the fillers used can be a mixture of quartz and of silica. The charges can be treated by any suitable product. From a weight standpoint, it is preferred to implement a quantity of filler comprised between 1% and 50% by weight, preferably between 1% and 40% by weight in relation to all the constituents of the composition.

Adhesion promoters are widely used in silicone compositions. Advantageously, in the method according to the invention one or more adhesion promoters can be implemented chosen from the group consisting of:

alkoxyl organosilanes containing, per molecule, at least one $C_2$-$C_6$ alkenyl group, selected from the products having the following general formula (DI):

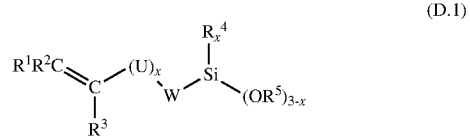

(D.1)

formula wherein:
$R^1$, $R^2$, $R^3$ are hydrogen or hydrocarbon radicals identical or different between them and represent a hydrogen atom, a $C_1$-$C_4$ linear or branched alkyl or a phenyl optionally substituted with at least one $C_1$-$C_3$ alkyl,
U is a $C_1$-$C_4$ linear or branched alkylene,
W is a valency bond,
$R^4$ and $R^5$ are identical or different radicals and represent a $C_1$-$C_4$ linear or branched alkyl,
x'=0 or 1, and
x=0 to 2.
organosilicon compounds comprising at least one radical epoxy, chosen from:
a) the products (D.2a) that have the following general formula:

(D.2a)

formula wherein:
$R^6$ is a $C_1$-$C_4$ linear or branched alkyl radical,
$R^7$ is a $C_1$-$C_4$ linear or branched alkyl radical,
y is equal to 0, 1, 2 or 3, and
X being defined by the following formula:

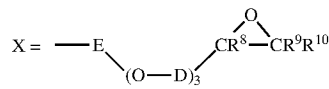

with:
E and D which are identical or different radicals chosen from $C_1$-$C_4$ linear or branched alkyls,
z which is equal to 0 or 1,
$R^8$, $R^9$, $R^{10}$ which are identical or different radicals representing a hydrogen atom or a $C_1$-$C_4$ linear or branched alkyl, and
$R^8$ and $R^9$ or $R^{10}$ able to alternatively form together and with the two carbons carrying the epoxy, an alkyl cycle having from 5 to 7 links, or
b) the products (D.2b) formed by epoxyfunctional polydiorganosiloxanes including:
(i) at least one siloxyl unit having formula (D.2 bi):

(D.2 bi)

formula wherein:
X is the radical such as defined hereinabove for the formula (D.2 a)
G is a monovalent hydrocarbon group chosen from the alkyl groups having from 1 to 8 carbon atoms inclusive, optionally substituted with at least one halogen atom, and thus from the aryl groups that contain between 6 and 12 carbon atoms, p=1 or 2,
q=0, 1 or 2,
p+q=1, 2 or 3 and
and (ii) optionally at least one siloxyl unit having formula (D.2 bii):

$$G_f SiO_{\frac{4-r}{2}} \quad \text{(D.2 bii)}$$

formula wherein:
G has the same meaning as hereinabove and
r is equal to 0, 1, 2 or 3.

organosilicon compounds comprising at least one hydrogenosilyl function and at least one radical epoxy and metal chelates M and/or metal alkoxides having general formula:

M(OJ)$_n$, wherein

M is chosen from the group formed by: Ti, Zr, Ge, Li, Mn, Fe, Al and Mg or the mixtures thereof
n=valence of M and J=C$_1$-C$_8$ linear or branched alkyl.
Preferably M is chosen from the following list: Ti, Zr, Ge, Li or Mn, and more preferably the metal M is Titanium. It is possible to associate with it, for example, a radical alkoxy of the butoxy type.

Silicone resins are well-known branched organopolysiloxane oligomers or polymers available off-the-shelf. They have, in their structure, at least two different units chosen from those having formula R$_3$SiO$_{1/2}$ (M unit), R$_2$SiO$_{2/2}$ (D unit), RSiO$_{3/2}$ (T unit) and SiO$_{4/2}$ (Q unit), at least one of these units being a T or Q unit.

The R radicals are identical or different and are chosen from C1-C6 linear or branched alkyl radicals, hydroxyl, phenyl, trifluoro-3,3,3 propyl. Mention can be made of for example as alkyl radicals, methyl, ethyl, isopropyl, tertiobutyl and n-hexyl radicals.

As examples of branched organopolysiloxane oligomers or polymers, mention can be made of MQ resins, MDQ resins, TD resins and MDT resins, the hydroxyl functions that can be carried by the M, D and/or T units. As an example of resins that are particularly suitable, mention can be made of hydroxylated MDQ resins that have a weight content in hydroxyl group comprised between 0.2 and 10% by weight.

Composition

The present invention also has for object, a composition X comprising:
at least one unsaturated compound A such as defined hereinabove,
at least one compound B comprising at least one hydrogenosilyl function such as defined hereinabove, and
nanoparticles or a colloidal suspension comprising nanoparticles such as defined hereinabove.

According to another embodiment of the invention, the composition X is a crosslinkable composition comprising:
at least one unsaturated compound A including, per molecule, at least two C$_2$-C$_6$ alkenyl radicals bonded to silicon atoms and, preferably, chosen from the organopolysiloxane compounds including units having formula (V):

$$Z_g U_h SiO_{(4-(g+h))/2} \quad \text{(V)}$$

wherein:
the Z radicals, identical or different, represent an alkenyl radical, linear or branched, having from 2 to 6 carbon atoms;
the U radicals, identical or different, represent a hydrocarbon radical having from 1 to 12 carbon atoms,
g=1 or 2, h=0, 1 or 2 and g+h=1, 2 or 3;
and including optionally other units having formula (VI):

$$U_i SiO_{(4-i)/2} \quad \text{(VI)}$$

wherein U has the same meaning as hereinabove, and i=0, 1, 2, or 3,
at least one organohydrogenopolysiloxane compound B including, per molecule, at least two hydrogen atoms, preferably at least three, bonded to an identical or different silicon atom, and
nanoparticles or a colloidal suspension comprising nanoparticles such as defined hereinabove.

According to a preferred embodiment of the invention, the composition X according to the invention is a crosslinkable composition, wherein compound B is chosen from the organopolysiloxanes comprising at least one unit having formula (VIII):

$$H_d U_e SiO_{(4-(d+e))/2} \quad \text{(VIII)}$$

wherein:
the U radicals, identical or different, represent a hydrocarbon radical having from 1 to 12 carbon atoms,
d=1 or 2, e=0, 1 or 2 and d+e=1, 2 or 3;
and optionally other units having formula (IX):

$$U_f SiO_{(4-f)/2} \quad \text{(IX)}$$

wherein U has the same meaning as hereinabove, and f=0, 1, 2, or 3.

The molar concentration in metal, coming from nanoparticles, of the composition X according to the invention is comprised between 0.01% and 15%, preferably between 0.05% and 10%, and more preferably between 0.1% and 4% in relation to the total number of moles of unsaturations carried by the unsaturated compound A.

According to an embodiment, the composition X according to the invention is free of catalyst with a platinum, palladium, ruthenium or rhodium base. "Free" from catalyst means that the composition X according to the invention comprises less than 10$^{-1}$% by weight of catalyst with a platinum, palladium, ruthenium or rhodium base, preferably less than 10$^{-2}$% by weight, and more preferably less than 10$^{-3}$% by weight, in relation to the total weight of the composition.

According to a particular embodiment, the composition X according to the invention also comprises one or more usual functional additives in silicone compositions. As families of usual functional additives, mention can be made of:
fillers;
adhesion promoters;
inhibitors or retardants of the hydrosilylation reaction;
adherence modulators;
silicone resins;
additives for increasing the consistency;
pigments; and
additives for thermal resistance, resistance to oils or resistance to fire, for example metal oxides.

The compositions X according to the invention can in particular be obtained by introducing under inert atmosphere firstly the nanoparticles or the colloidal suspension comprising nanoparticles in the reaction medium, then by adding compound A under stirring. Finally, compound B is introduced and, if necessary, the temperature of the mixture is increased in order to reach the reaction temperature.

The invention also has for object a crosslinked silicone material Y obtained by heating to a temperature ranging from 15° C. and 150° C., of a crosslinkable composition X comprising:
at least one unsaturated compound A including, per molecule, at least two C$_2$-C$_6$ alkenyl radicals bonded to silicon atoms and chosen from the organopolysiloxane compounds including units having formula (V):

$$Z_g U_h SiO_{(4-(g+h))/2} \quad \text{(V)}$$

wherein:
the Z radicals, identical or different, represent an alkenyl or alkynyl radical, linear or branched, having from 2 to 6 carbon atoms;
the U radicals, identical or different, represent a hydrocarbon radical having from 1 to 12 carbon atoms,
g=1 or 2, h=0, 1 or 2 and g+h=1, 2 or 3; and including optionally other units having formula (VT):

$$U_iSiO_{(4-i)/2} \qquad (VI)$$

wherein U has the same meaning as hereinabove, and i=0, 1, 2, or 3,
at least one organohydrogenopolysiloxane compound B including, per molecule, at least two hydrogen atoms bonded to an identical or different silicon atom, and
nanoparticles or a colloidal suspension comprising nanoparticles such as defined hereinabove.

The present invention is shown in more detail in the non-limiting embodiments.

EXAMPLES

Example 1: Synthesis of Fe Nanoparticles with an Oxidation State of 0

Under inert atmosphere, 276.9 mg (0.55 mmol) of $Fe_3(CO)_{12}$ and 50 mL of dry and degassed toluene are added to a Fisher-Porter reactor equipped with a magnetic stirrer bar. While maintaining stirring, 96 µL (0.5 mmol) of n-octylsilane are added to the solution. The whole is pressurised under 3 bars of hydrogen and heated to 80° C. for 24 h. After cooling, the solution is transferred into a Schienk and kept under argon.

Figure 1B:
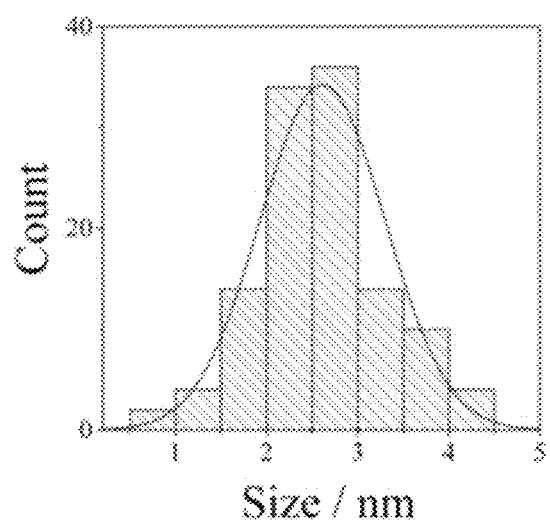
FIG. 1B shows a histogram of the diameter of the iron nanoparticles according to example 1.

The average diameter of the iron nanoparticles was measured by HAADF STEM (Scanning Transmission Electron Microscopy in the High Angle Annular Dark Field imaging mode). FIG. 1A shows a HAADF STEM photo of the colloidal solution comprising iron nanoparticles. FIG. 1B shows the number of nanoparticles according to their diameter. The average diameter of the nanoparticles is 2.6 nm±0.7 nm.

Figure 2:
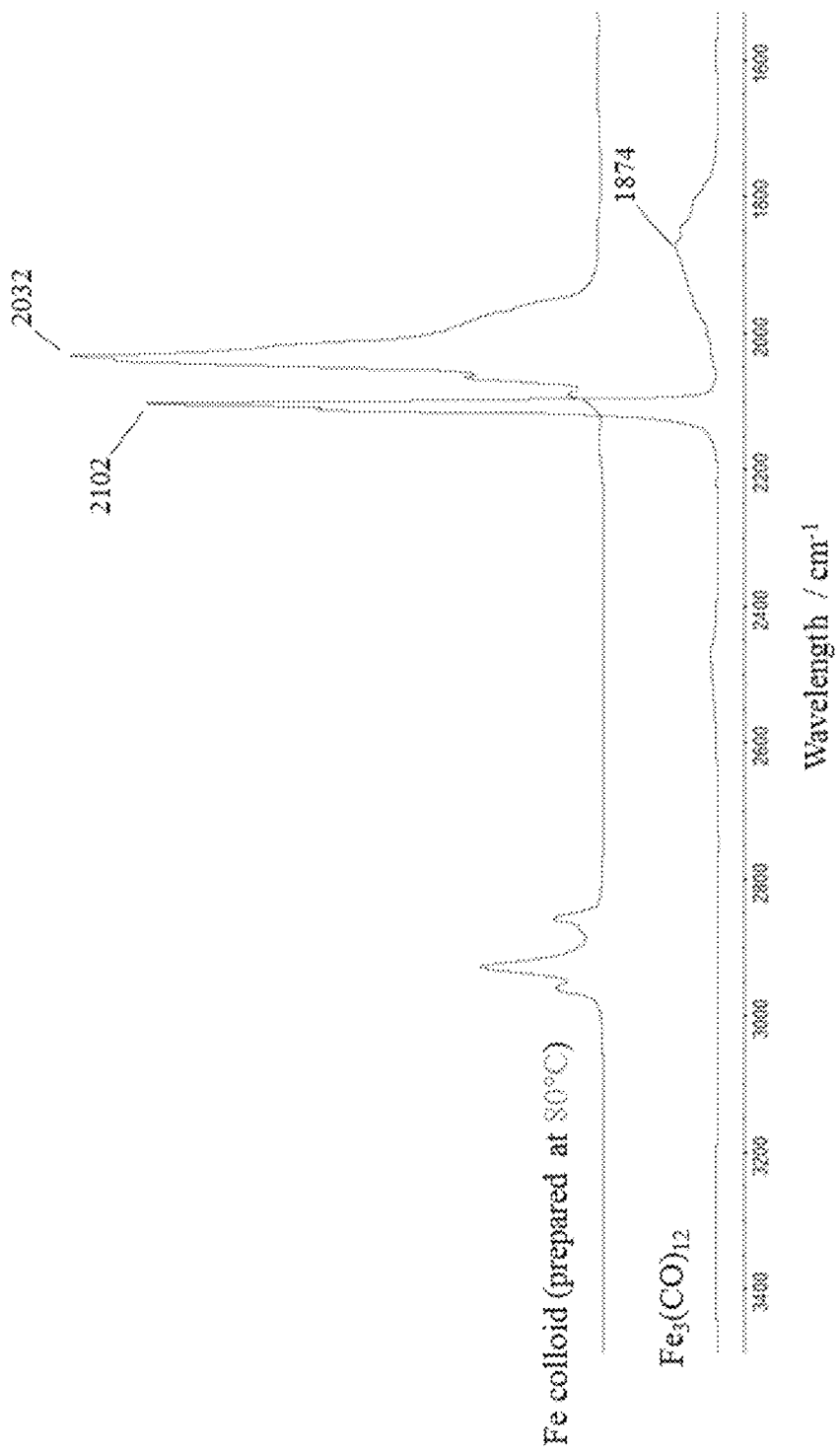
FIG. 2 shows the infrared spectrum of the iron nanoparticles according to example 1 and of the iron precursor used.

The iron nanoparticles impregnated on $SiO_2$ were analysed by infrared spectroscopy and compared to the precursor used ($Fe_3(CO)_{12}$). FIG. 2 shows the results obtained. These results show that there is no longer any precursor present in the nanoparticles and that the carbonyl ligands are well coordinated to the iron of the nanoparticles. Moreover, the peaks between 2,800 and 3,000 $cm^{-1}$ demonstrate the presence of at least one silicide on the nanoparticles.

Figure 3:
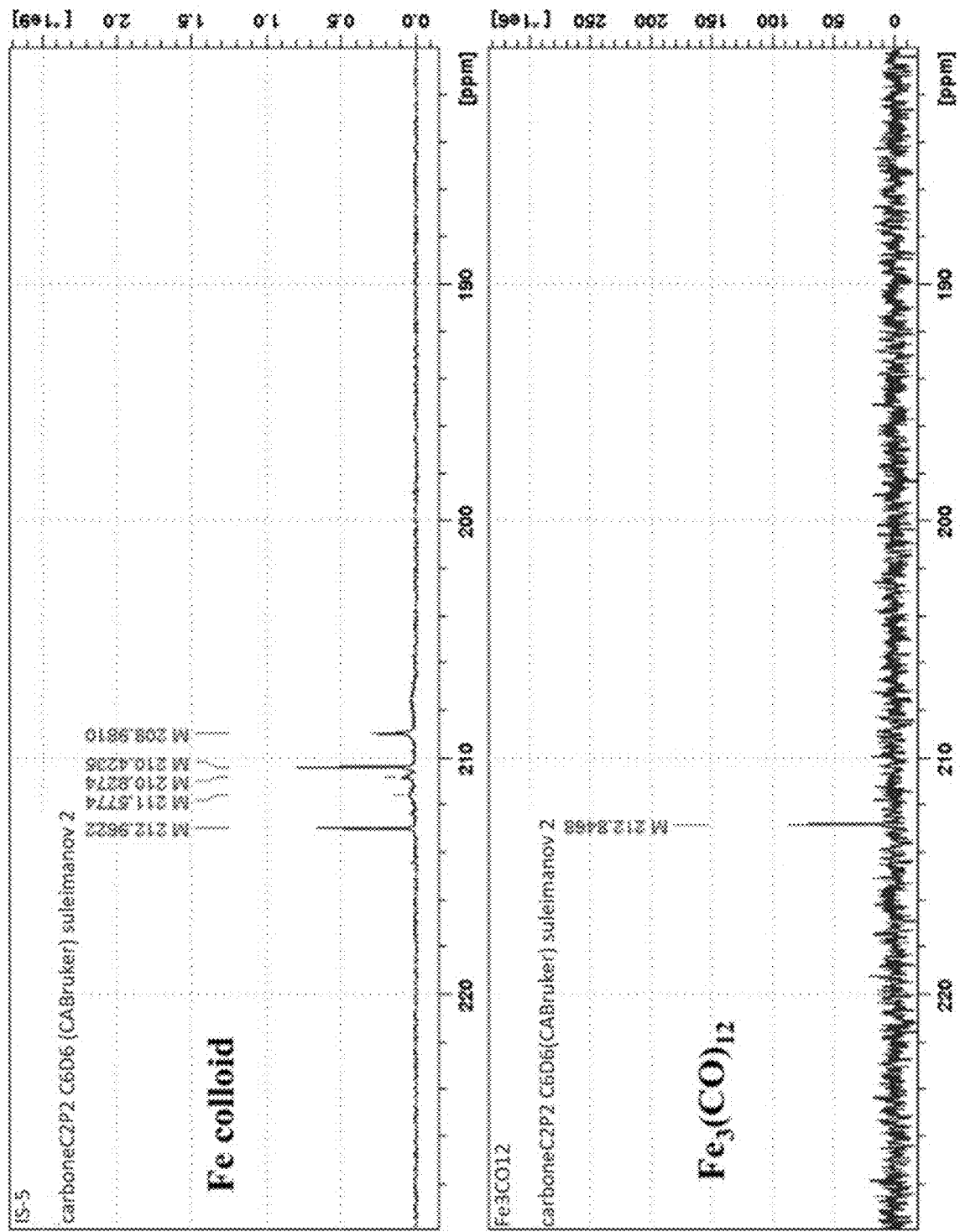
FIG. 3 shows the $^{13}$C-NMR spectrum of the iron nanoparticles according to example 1 and of the iron precursor used.
Figure 4:
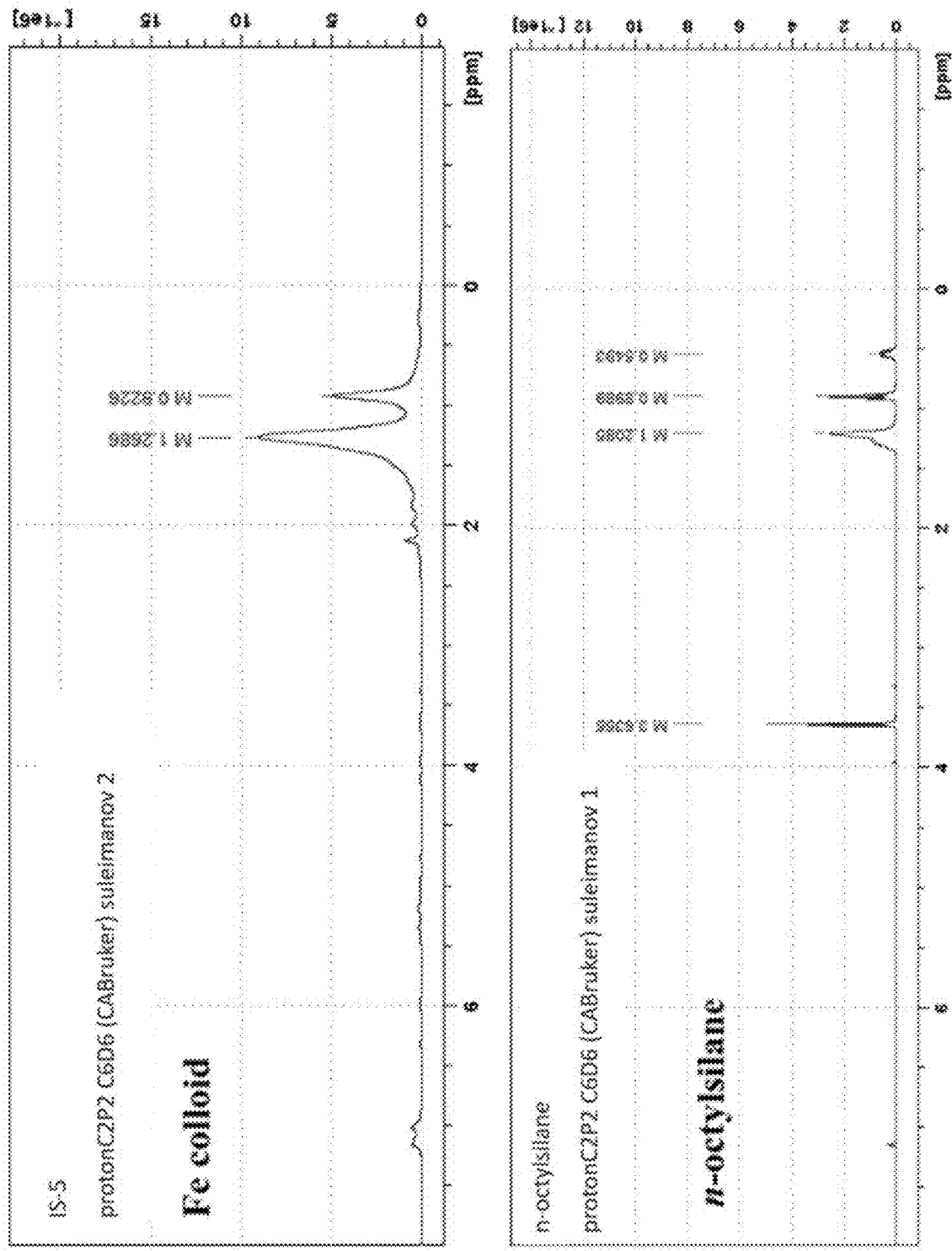
FIG. 4 shows the $^1$H-NMR spectrum of the iron nanoparticles according to example 1 and of the n-octylsilane.
Figure 5A:
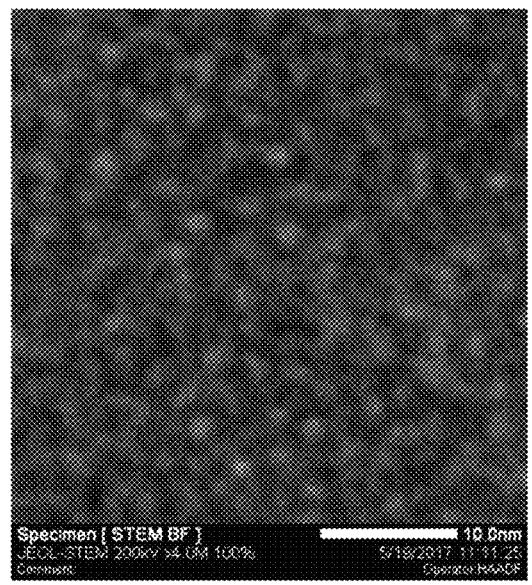
FIG. 5A shows a HAADF STEM photo of the colloidal solution comprising cobalt nanoparticles according to example 2.
Figure 5B:
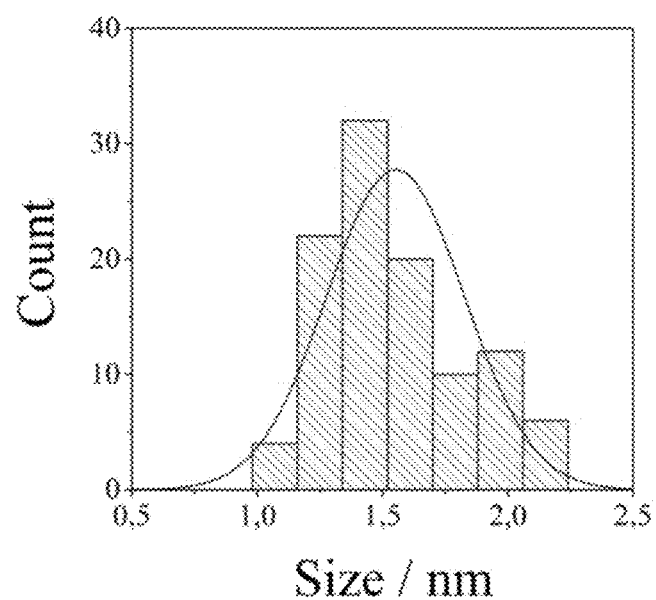
FIG. 5B shows a histogram of the diameter of the cobalt nanoparticles according to example 2 according to their diameter.

The nanoparticles were also characterised by NMR. FIG. 3 shows the $^{13}C$-NMR spectrum of the iron nanoparticles and of the precursor used ($Fe_3(CO)_{12}$) between 180 and 230 ppm. These results show that the precursor is transformed and that the carbonyl ligands are well coordinated to the iron of the nanoparticles. FIG. 4 shows the $^1H$-NMR spectrum of the iron nanoparticles and of the n-octylsilane. These results show that the n-octylsilane did indeed react with $Fe_3(CO)_{12}$ because the peak at 3.6 ppm is no longer visible.

Figure 9:
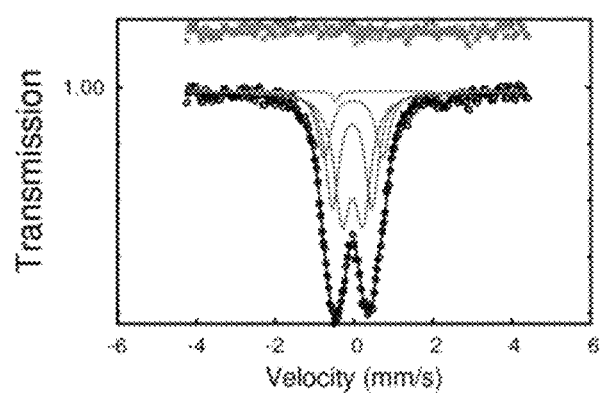
FIG. 9 shows the Mossbauer spectrum of the iron nanoparticles according to example 1.

The nanoparticles were also characterised by Mossbauer spectroscopy. FIG. 9 shows the Mossbauer spectrum obtained. This spectrum shows that the nanoparticles obtained include iron with an oxidation state of 0, at least one silicide and that they do not have any magnetic contribution, therefore they are not paramagnetic.

The operating procedure hereinabove was also used to synthesise nanoparticles by varying the temperature and the iron precursor (cf. table 1).

Comparative Example 1: Synthesis of Fe Nanoparticles without CO Ligand

Iron nanoparticles that do not contain any carbonyl ligand were also synthesised. These nanoparticles were synthesised according to the operating procedure hereinabove at 120° C., using $Fe(C_8H)_2$ and under 3 bars CO. Despite the CO atmosphere, the nanoparticles obtained do not include carbonyl ligand.

Comparative Example 2: Synthesis of Fe Nanoparticles at 140° C.

Iron nanoparticles were also synthesised according to the operating procedure of example 1 at 140° C. The iron nanoparticles impregnated on $SiO_2$ were analysed by infrared spectroscopy. The spectrum obtained shows that the iron nanoparticles prepared at 140° C. do not include carbonyl ligand.

Example 2: Synthesis of Co Nanoparticles with an Oxidation State of 0

Under inert atmosphere, 188 mg (0.55 mmol) of $Co_2(CO)_8$ and 50 mL of dry and degassed toluene are added to a Fisher-Porter reactor provided with a magnetic stirrer bar. While maintaining stirring, 64 µL (0.33 mmol) of n-octylsilane are added to the solution. The whole is pressurised under 3 bars of hydrogen and heated to 80° C. for 24 h. After cooling, the solution is transferred into a Schlenk and kept under argon.

The average diameter of the cobalt nanoparticles was measured by HAADF STEM. Figure SA shows a HAADF STEM photo of the colloidal solution comprising cobalt nanoparticles. Figure SB shows the number of nanoparticles according to their diameter. The average diameter of the nanoparticles is 1.6 nm±0.3 nm.

Figure 6:
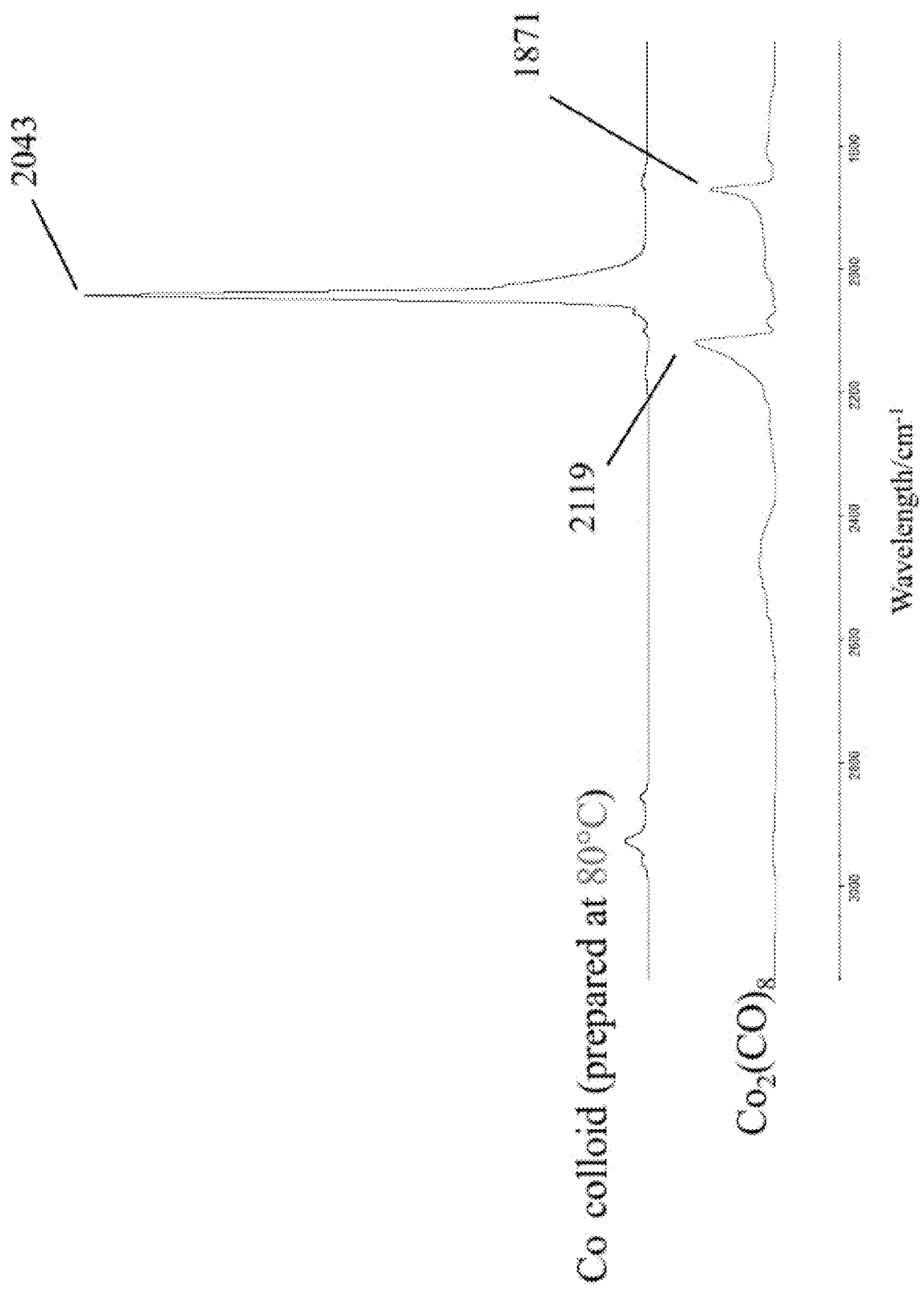
FIG. 6 shows the infrared spectrum of the cobalt nanoparticles according to example 2 and of the cobalt precursor used.

The infrared spectrum of the cobalt nanoparticles impregnated on $SiO_2$ was conducted and compared to that of the precursor used ($Co_2(CO)_8$). FIG. 6 shows the results obtained. These results show that there is no longer any precursor and that carbonyl ligands coordinated to the cobalt of the nanoparticles are indeed obtained.

Figure 7:
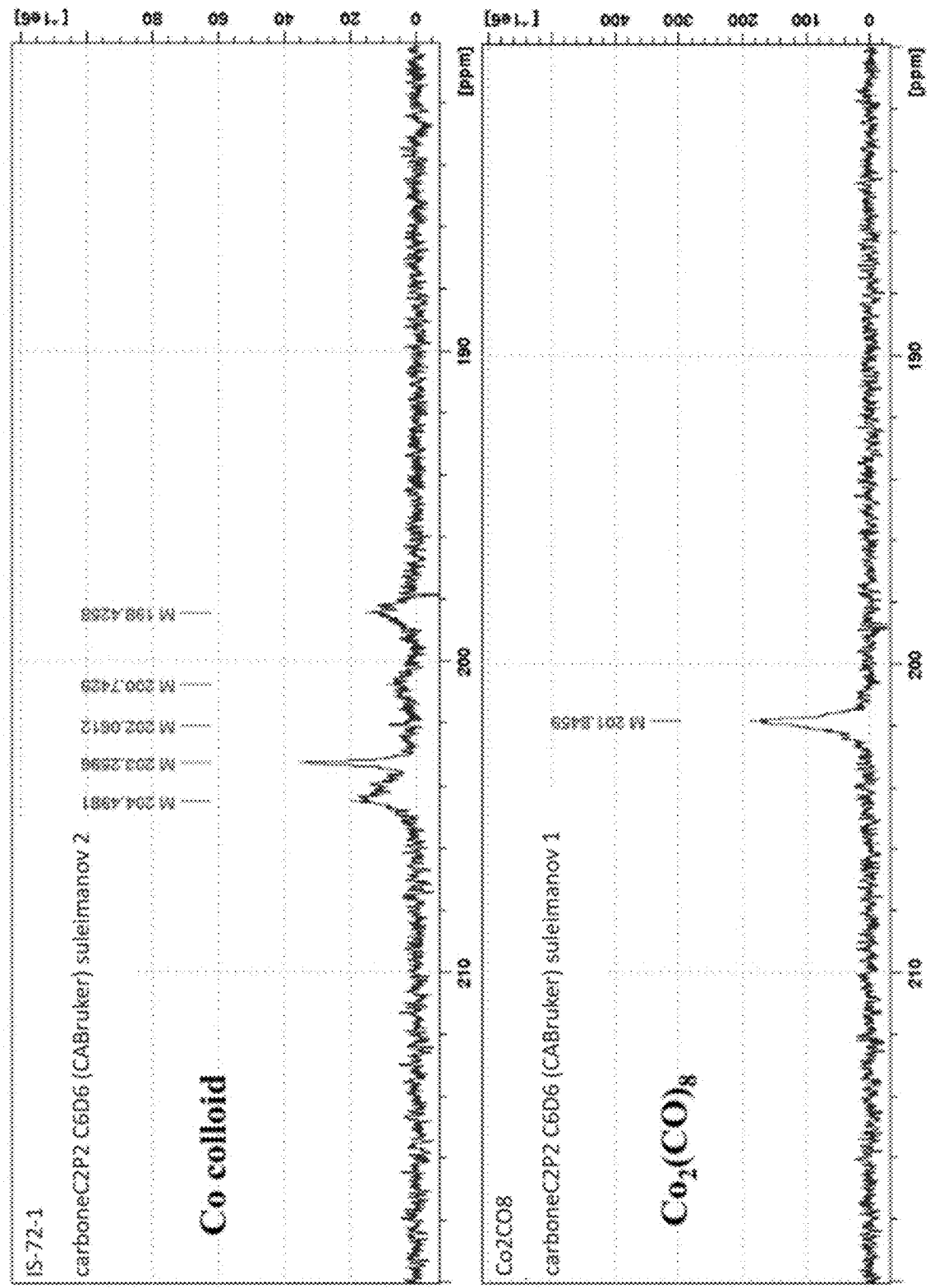
FIG. 7 shows the $^{13}$C-NMR spectrum of the cobalt nanoparticles according to example 2 and of the cobalt precursor used.
Figure 8:
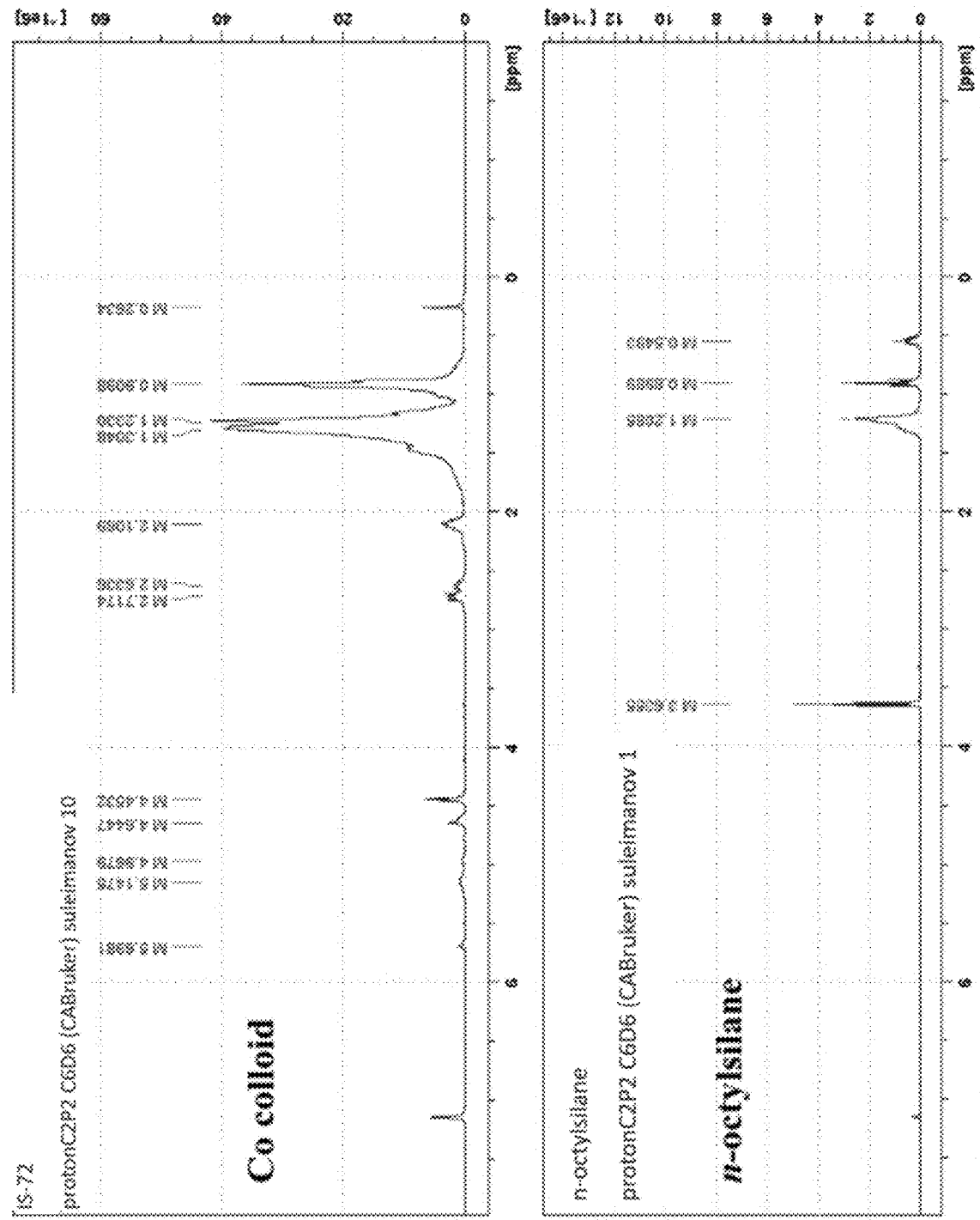
FIG. 8 shows the $^1$H-NMR spectrum of the cobalt nanoparticles according to example 2 and of the n-octylsilane.

The nanoparticles were also characterised by NMR. FIG. 7 shows the $^{13}C$-NMR spectrum of the cobalt nanoparticles and of the precursor used ($Co_2(CO)_8$) between 180 and 230 ppm. These results show that there is no longer any precursor and that the carbonyl ligands are well coordinated to the cobalt of the nanoparticles. FIG. 4 shows the $^1H$-NMR spectrum of the cobalt nanoparticles and of the n-octylsilane. These results show that the n-octylsilane did indeed react with $Co_2(CO)_8$ because the peak at 3.6 ppm is no longer visible.

The operating procedure hereinabove was also used to synthesise nanoparticles by varying the temperature and the atmosphere (cf. table 2).

Example 3: Hydrosilylation Reaction with Synthesised Nanoparticles

Under inert atmosphere, 0.6 g mL (2.5 mmol) of MD'M (with M: $(CH_3)_3SiO_{1/2}$ and D': $(CH_3)HSiO_{2/2}$), 0.77 mL (2.5 mmol) of 1-octene and 0.25 mL (1.1 mmol) of dodecane are added to a Schlenk provided with a magnetic stirrer bar. In this mixture, 1.5 mL of colloidal suspension in the toluene containing 0.05 mmol of Fe (tests 1-4, table 1) or 0.033 mmol of Co (tests 5-8, table 2) is added. The reaction mixture obtained is stirred for 24 h at 120° C. in the case of the catalyst with Fe or at room temperature if the catalyst with Co is used. The change in the reaction is controlled via GC (gas chromatography). The results are shown in tables 1 and 2.

TABLE 1

Reaction with, as a catalyst, the iron nanoparticles with an oxidation state of 0

| Test | Catalyst Synthesis conditions | % mol of Fe (alkene base) | Time (h) | Ratio SiH/alkene | Temp. (° C.) | Conv. MD'M (%) | Yield produced HS (%) |
|---|---|---|---|---|---|---|---|
| 1 | 0.3 equiv. of n-octylsilane, $Fe_3(CO)_{12}$, 80° C., 3 bars $H_2$ | 2 | 24 | 1 | 120 | 26 | 16 |
| 2 | 0.3 equiv. of n-octylsilane, $Fe_3(CO)_{12}$, 120° C., 3 bars $H_2$ | 2 | 24 | 1 | 120 | 44 | 20 |
| 3 | 0.3 equiv. of n-octylsilane, $Fe(CO)_5$, 120° C., 3 bars $H_2$ | 2 | 24 | 1 | 120 | 30 | 20 |
| 4 | 0.3 equiv. of n-octylsilane, $Fe(C_8H_8)_2$, 120° C., 3 bars CO (comparative example 1) | 2 | 24 | 1 | 120 | 0 | 0 |
| 4' | 0.3 equiv. of n-octylsilane, $Fe_3(CO)_{12}$, 140° C., 3 bars $H_2$ (comparative example 2) | 2 | 24 | 1 | 120 | <1% | <1% |

These results show that the iron nanoparticles synthesised according to example 1 catalyse the hydrosilylation reaction between the MD'M and the 1-octene (tests 1 to 3). The dehydrogenative silylation product is also observed as well as isomerisation products of 1-octene.

These results also show that the iron nanoparticles that do not comprise CO ligand do not catalyse the hydrosilylation reaction (tests 4 and 4'). The presence of at least one ligand CO on the nanoparticles is essential.

These results show that the cobalt nanoparticles synthesised according to example 2 catalyse the hydrosilylation reaction between the MD'M and the 1-octene. The dehydrogenative silylation product is also observed as well as isomerisation products of 1-octene.

These results also show that the nanoparticles can be synthesised under inert atmosphere or under pressure of hydrogen (test 8).

TABLE 2

Reaction with, as a catalyst, the cobalt nanoparticles with an oxidation state of 0

| Test | Catalyst | % mol of Co (alkene base) | Time (h) | Ratio SiH/alkene | Temp. (° C.) | Conv. MD'M (%) | Yield produced HS (%) |
|---|---|---|---|---|---|---|---|
| 5 | 0.075 equiv. of n-octylsilane, $Co_2(CO)_8$, 80° C., 3 bars $H_2$ | 1.3 | 24 | 1 | RT | 88 | 73 |
| 6 | 0.075 equiv. of n-octylsilane, $Co_2(CO)_8$, 80° C., 3 bars $H_2$ | 0.13 | 17 | 1 | RT | 78 | 71 |
| 7 | 0.075 equiv. of n-octylsilane, $Co_2(CO)_8$, 60° C., 3 bars $H_2$ | 1.3 | 24 | 1 | RT | 90 | 77 |
| 8 | 0.075 equiv. of n-octylsilane, $Co_2(CO)_8$, room temperature, $N_2$ | 1.3 | 24 | 1 | RT | 94 | 81 |

Example 4: Hydrosilylation Reaction on More Substantial Quantities and with Another Alkene In a three-neck flask provided with a refrigerant, under a nitrogen flush are introduced 2 g of MD'M, alkene, dodecane (GC internal standard) and where applicable toluene (solvent). The colloidal suspension of cobalt nanoparticles (with a metal precursor concentration 22 µmol/mL, synthesised according to example 2 with the conditions of test 8, table 2) is then added under stirring at room temperature. The reaction crude is then analysed by $^1$H-NMR and by GC. The results are shown in table 3.

TABLE 3

Hydrosilylation reaction with 2 g of MD'M and ether glycidyl allyl

| Test | Alkene | Solvent | Colloidal suspension | % mol of Co (alkene base) | Ratio Alkene/SiH | Conv. MD'M (%) | Yield produced HS (%) |
|---|---|---|---|---|---|---|---|
| 9 | 1-octene | 1-octene (21.3 g) | 4.6 mL | 0.05% | 21.2 | 72% after 20 h | Undetermined |
| 10 | Ether glycidyl allyl | Toluene (20.2 g) | 4.5 mL | 0.85% | 1.3 | 11% after 1 h40 | Undetermined |

For tests 9 and 10, the analyses $^1$H-NMR show that the hydrosilylation product is obtained. These results show that the cobalt nanoparticles synthesised according to example 2 catalyse the hydrosilylation reaction between the MD'M and the ether glycidyl allyl. These results also show that the unsaturated compound can play the role of a solvent.

The invention claimed is:

1. A method for preparing hydrosilylation and/or dehydrogenative silylation products by reaction:
   between an unsaturated compound A which is a compound comprising at least one unsaturation that is not part of an aromatic cycle, and
   a compound B comprising at least one hydrogenosilyl function,
   wherein said method is catalysed
   (i) either by nanoparticles having an average diameter, determined by transmission electron microscopy, less than or equal to 50 nm, and comprising:
   at least one transition metal with an oxidation state of 0, chosen from the metals of columns 8, 9 and 10 of the periodic table,
   at least one carbonyl ligand, and
   at least one silicide wherein said silicide is chosen from compounds having formula (I):

$$Y_p Z4_q SiH_r \qquad (I)$$

wherein:
   the symbol(s) Y, identical or different, represent a metal chosen from the metals of columns 8, 9 and 10 of the periodic table;
   the symbol(s) Z4, identical or different, represent an alkyl group having from 1 to 18 carbon atoms inclusive;
   p=1, 2 or 3;
   q=1, 2 or 3;
   r=0, 1 or 2;
   p+q+r=4
   (ii) or by a colloidal suspension comprising said nanoparticles.

2. Method according to claim 1, wherein said method is implemented under UV radiation.

3. The method of claim 1, wherein the metal is chosen from the group consisting of Fe, Co and Ni.

4. The method of claim 1, wherein said nanoparticles have an average diameter less than or equal to 10 nm.

5. The method of claim 1, wherein the symbol(s) Z4, identical or different, represent a linear alkyl group having 4 to 12 carbon atoms inclusive.

6. A composition X comprising:
   at least one unsaturated compound A which is a compound comprising at least one unsaturation that is not part of an aromatic cycle,
   at least one compound B comprising at least one hydrogenosilyl function, and
   (i) either nanoparticles having an average diameter, determined by transmission electron microscopy, less than or equal to 50 nm, and comprising:
   at least one transition metal with an oxidation state of 0, chosen from the metals of columns 8, 9 and 10 of the periodic table,
   at least one carbonyl ligand, and
   at least one silicide wherein said silicide is chosen from compounds having formula (I):

$$Y_p Z4_q SiH_r \qquad (I)$$

wherein:
   the symbol(s) Y, identical or different, represent a metal chosen from the metals of columns 8, 9 and 10 of the periodic table;
   the symbol(s) Z4, identical or different, represent an alkyl group having from 1 to 18 carbon atoms inclusive;
   p=1, 2 or 3;
   q=1, 2 or 3;
   r=0, 1 or 2;
   p+q+r=4
   (ii) or a colloidal suspension comprising said nanoparticles.

7. The composition of claim 6, wherein the metal is chosen from the group consisting of Fe, Co and Ni.

8. The composition of claim 6, wherein said nanoparticles have an average diameter less than or equal to 10 nm.

9. The composition of claim 6, wherein the symbol(s) Z4, identical or different, represent a linear alkyl group having 4 to 12 carbon atoms inclusive.

* * * * *